(No Model.)

R. W. RIESS.
MECHANISM FOR AUTOMATICALLY OPERATING THE ADJUSTABLE SADDLES OF BICYCLES, &c.

No. 510,993.    Patented Dec. 19, 1893.

WITNESSES:
W. A. Schaefer
W. Jackson

INVENTOR:
Rudolph W. Riess,
By J. Walter Douglass.
Att'y.

UNITED STATES PATENT OFFICE.

RUDOLPH W. RIESS, OF PHILADELPHIA, PENNSYLVANIA.

MECHANISM FOR AUTOMATICALLY OPERATING THE ADJUSTABLE SADDLES OF BICYCLES, &c.

SPECIFICATION forming part of Letters Patent No. 510,993, dated December 19, 1893.

Application filed March 10, 1893. Serial No. 465,394. (No model.)

*To all whom it may concern:*

Be it known that I, RUDOLPH WILLIAM RIESS, a citizen of the United States, residing at Philadelphia, in the county of Philadelphia and State of Pennsylvania, have invented certain new and useful Improvements in Mechanism for Automatically Operating the Adjustable Saddles of Bicycles and other Vehicles, of which the following is a specification.

The principal objects of my invention are first, to provide simple, efficient, durable and compact mechanism for retaining the saddle of a bicycle or other vehicle in a depressed position in order to permit the rider to readily mount the vehicle and the saddle to assume its normal position upon the seating of the rider thereto; and second, to provide an adjustable saddle for a bicycle or other vehicle adapted to be readily depressed and held in a certain position for permitting a person to mount the vehicle and engage the propelling mechanism thereof and of the saddle being permitted to become released and to automatically rise to its normally fixed position through pressure exerted upon the same in the seating of the rider thereto.

My invention consists of a vehicle provided with a spring controlled saddle adapted to occupy elevated and depressed positions and to automatically assume its elevated position by pressure exerted thereon.

My invention further consists of a bicycle or other vehicle provided with a saddle tending to a normal position and a pawl, detent or catch adapted to restrain the same from such position and to be automatically released by pressure exerted on the saddle to cause the same to assume said normal position; and my invention further consists of the improvements in bicycles hereinafter described and claimed.

The nature, general features and scope of my invention will be more fully understood from the following description taken in connection with the accompanying drawings forming part hereof, and in which—

Figure 1:
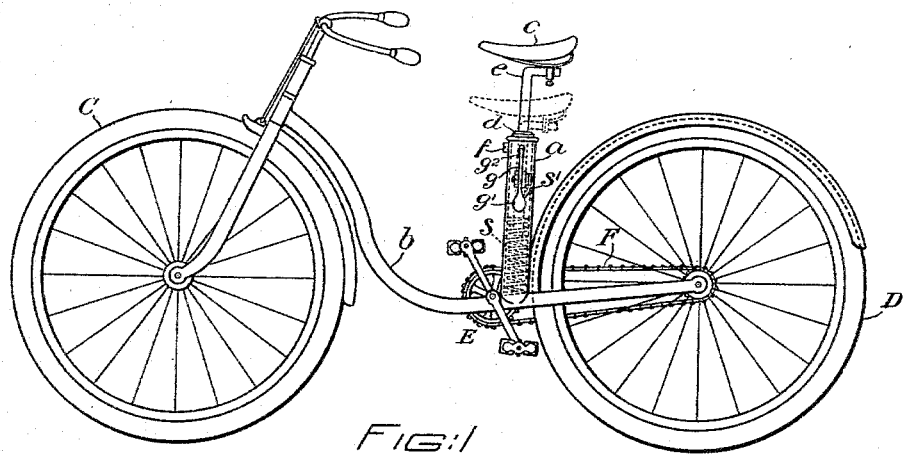
Figure 2:
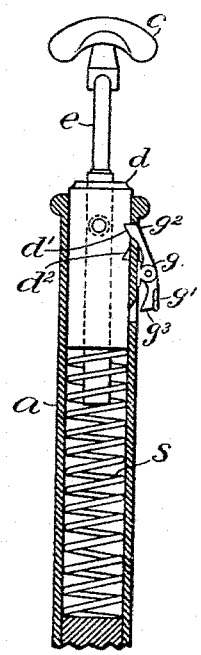
Figure 4:
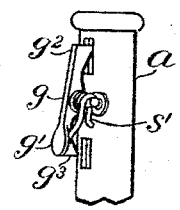
Figure 3:
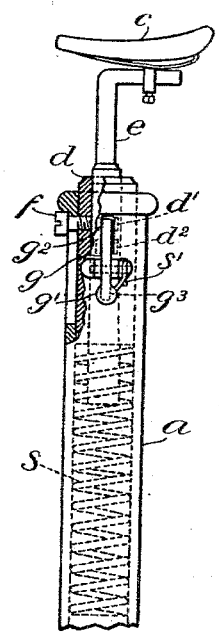

Figure 1, is a side elevational view of a bicycle embodying features of my invention and illustrating in dotted lines the depressed position of the saddle or seat. Fig. 2, is a view partly in elevation and partly in transverse central section taken from the front of the bicycle and illustrating on an enlarged scale the saddle or seat, pawl, detent or catch and their accessories. Fig. 3, is a view partly in side elevation and partly in section of the parts of my invention illustrated in Fig. 2; and Fig. 4, is a perspective view illustrating the spring controlled pawl, detent or catch.

In the drawings $a$, is a hollow post secured to or carried by the main-frame $b$, of the vehicle provided with pilot and driving wheels C and D and adapted to support the saddle or seat $c$, susceptible of both vertical and horizontal adjustment.

E, is propelling mechanism suitably connected with the main-frame or back-bone $b$, of the vehicle adjacent to the hollow post $a$.

F, is a sprocket-chain connected with suitable means applied to the driving wheel for effecting the actuation of the vehicle.

$d$, is a sleeve afforded a range of play in the hollow post or barrel $a$.

$s$, is a spiral spring interposed between the sleeve $d$, and the closed lower extremity of the hollow post $a$, and tending to shift the sleeve $d$, in an upward direction.

$e$, is a rod or arm suitably connected with the saddle $c$, and fitted to the sleeve $d$.

$f$, is a set-screw penetrating an aperture in the sleeve $d$, and having its shank working through a slot in the wall of the post or barrel $a$, and adapted to limit the range of vertical movement of the sleeve. The point of the set-screw $f$, engages the saddle rod or arm $e$, and thus affords means for permitting the same to be adjusted upward and downward in order to accommodate riders of different sizes.

$g$, is a pawl, detent or catch centrally pivoted to lugs secured to the surface of the hollow post $a$, and provided with an operating handle $g'$.

$s'$, is a spiral spring coiled around the axis of the pawl, detent or catch $g$, and having one of its extremities in engagement with the pawl, detent or catch and the other of its extremities in engagement with the post $a$. This spring $s'$, tends to shift the upper extremity $g^2$, of the pawl, detent or catch through an opening or slot in the wall of the post $a$, and into engagement with a recess or notch $d'$, cut or otherwise formed in the exterior wall of the sleeve $d$, in order to maintain the saddle $c$, in its normal or elevated position, as illustrated in full lines in Fig. 1. The lower extremity $g^3$, of the pawl, detent or catch $g$, may be shifted manually by means of the operating handle $g'$, through an opening or slot in the wall of the post $a$, into engagement with a notch or recess $d^2$, cut or otherwise formed in the wall of the sleeve $d$, in order to lock the same in a depressed position, as illustrated in dotted lines in Fig. 1, whereby the rider is enabled to readily mount the vehicle.

The mode of operation of the hereinbefore described mechanism, is as follows:—The saddle rod or arm $e$, may be adjusted in the sleeve $d$, and then clamped to place by means of the set-screw $f$, in order to adapt the saddle or seat to riders of different heights. Preparatory to mounting the vehicle the pawl, detent or catch $g$, is turned by means of the operating handle $g'$, into the position for lifting the end $g^2$ thereof, out of engagement with the notch $d'$, of the sleeve $d$, whereupon the saddle $c$, is caused to assume the depressed position indicated by the dotted lines of Fig. 1, and is locked in such position by manually shifting the lower end $g^3$, of the pawl, detent or catch into engagement with the notch $d^2$, whereupon the rider may readily assume a position above the same. As soon as the rider is brought into contact with the seat or saddle $c$, the arm or rod $e$, and sleeve $d$, are slightly depressed, whereupon the end $g^3$, of the pawl, detent or catch $g$, is automatically released from the notch $d^2$, and moving under the influence of the spring $s'$, permits the spring $s$, to shift the sleeve $d$, rod or arm $e$, and saddle $c$, upward into normal position, as illustrated by the full lines in Fig. 1. The upward movement of the saddle $c$, is checked by the set-screw $f$, coming in contact with the upper end of its slot, whereupon the end $g^2$, of the pawl, detent or catch $g$, moving under the influence of the spring $s'$, automatically engages the notch $d'$, and thus prevents accidental descent of the saddle or seat $c$.

Among many advantageous features of a saddle arranged for operation as hereinbefore described may be mentioned that in mounting the vehicle, while the saddle is maintained in a depressed position, it can be readily straddled and the feet brought into engagement with the propelling mechanism thereof, for imparting motion thereto, before the rider assumes a position in contact with the saddle released by pressure exerted thereon in such manner as to rise with the rider and to automatically assume its normal elevated position with an easy and safe upward movement for the occupant of the vehicle and locked in such elevated position. This arrangement of a saddle avoids all running mounts to start the vehicle and so that the rider may become a fixture thereof while in motion. Moreover, this saddle is especially adapted for females, because tendency to overturning of the vehicle in the starting of the same into motion is entirely obviated, because the vehicle can be mounted and started while the saddle is in its depressed position or at the point of starting the same it may be caused to automatically assume its normal elevated fixed position.

Having thus described the nature and objects of my invention, what I claim as new, and desire to secure by Letters Patent, is—

1. A bicycle or other vehicle provided with a spring controlled adjustable saddle and a locking device automatically released by pressure upon the saddle to permit the latter to return to its elevated or normal position, substantially as and for the purposes set forth.

2. A bicycle or other vehicle provided with a spring controlled adjustable saddle or seat, and mechanism for locking the same in a depressed position, and unlocked by pressure exerted thereon and restored to its normal position by the release of pressure after having been unlocked and locked in its normal position by said mechanism, substantially as and for the purposes set forth.

3. In a bicycle or other vehicle, a pivotal pawl, detent or catch adapted to lock a vertically adjustable saddle near its lowest position, a spring for withdrawing said pawl, detent or catch and automatically releasing the saddle by the further depression of the latter and a spring for returning said saddle to its normal or raised position, substantially as and for the purposes set forth.

4. A bicycle or other vehicle provided with a saddle tending to occupy its normal position and adapted to be depressed and with a pawl, detent or catch tending to retain the saddle in normal position and to lock the same in its depressed position and to automatically release the saddle from such position after the rider has mounted the saddle, substantially as and for the purposes set forth.

5. A bicycle or other vehicle provided with a post, a spring controlled notched sleeve working in said post and provided with a saddle, a centrally pivoted pawl, detent or catch having its respective extremities adapted to engage said notched sleeve, and a spring operating to withdraw said pawl, detent or catch when the saddle is fully depressed, substantially as and for the purposes set forth.

6. A bicycle or other vehicle provided with a post, a notched sleeve working in said post and provided with a saddle, a spring tending to vertically shift said sleeve, a spring controlled pivotal pawl, detent or catch provided with an operating handle and having one of its respective extremities adapted to engage the notched sleeve, a spring operating to withdraw said pawl, detent or catch when the saddle is fully depressed, and a locking mechanism for retaining said saddle in its raised or normal position, substantially as and for the purposes set forth.

In testimony whereof I have hereunto set my signature in the presence of two subscribing witnesses.

RUDOLPH W. RIESS.

Witnesses:
WM. H. EBERLÉ,
JOSEPH H. EBERLÉ.